(12) United States Patent
Jonsson et al.

(10) Patent No.: US 10,454,795 B1
(45) Date of Patent: Oct. 22, 2019

(54) INTERMEDIATE BATCH SERVICE FOR SERVERLESS COMPUTING ENVIRONMENT METRICS

(71) Applicant: Amazon Technologies, Inc., Seattle, WA (US)

(72) Inventors: Jan Henrik Jonsson, Long Beach, CA (US); Ryan Idrogo-Lam, Irvine, CA (US); Ryan Newcomb Durkin, Long Beach, CA (US)

(73) Assignee: Amazon Technologies, Inc., Seattle, WA (US)

(*) Notice: Subject to any disclaimer, the term of this patent is extended or adjusted under 35 U.S.C. 154(b) by 280 days.

(21) Appl. No.: 15/466,576

(22) Filed: Mar. 22, 2017

(51) Int. Cl.
G06F 15/173 (2006.01)
G06F 15/16 (2006.01)
H04L 12/26 (2006.01)
H04L 29/06 (2006.01)

(52) U.S. Cl.
CPC .......... H04L 43/062 (2013.01); H04L 65/605 (2013.01)

(58) Field of Classification Search
CPC ............................ H04L 43/062; H04L 65/605
USPC .................................. 709/202–203, 223–224
See application file for complete search history.

(56) References Cited

U.S. PATENT DOCUMENTS

| | | | |
|---|---|---|---|
| 6,496,850 B1* | 12/2002 | Bowman-Amuah | ...................... G06F 9/4493 709/224 |
| 8,589,949 B2* | 11/2013 | Biazetti | ............... G06F 9/541 709/223 |
| 10,021,146 B2* | 7/2018 | Lee | ...................... H04L 65/403 |
| 2010/0017782 A1* | 1/2010 | Chaar | ................... G06Q 10/06 717/101 |
| 2014/0143419 A1* | 5/2014 | Vyatkin | ..................... H02J 3/46 709/224 |
| 2016/0182652 A1* | 6/2016 | Bevilacqua | ............. G06F 9/546 709/203 |
| 2018/0285372 A1* | 10/2018 | Dosovitsky | .......... H04L 43/062 |
| 2019/0042604 A1* | 2/2019 | Broch | .................. G06F 3/0604 |

(Continued)

OTHER PUBLICATIONS

U.S. Appl. No. 14/971,116, filed Dec. 16, 2015, Brooker, et al.

(Continued)

*Primary Examiner* — Bharat Barot
(74) *Attorney, Agent, or Firm* — Robert C. Kowert; Meyertons, Hood, Kivlin, Kowert & Goetzel, P.C.

(57) ABSTRACT

Devices and processes perform a metrics aggregation process within the context of a serverless compute environment that includes a fleet of execution environment containers for executing ephemeral functions. In response to receipt of triggering events, functions, registered to handle the events, are launched in separate execution environments of an event-driven compute service. The functions generate metrics that are sent to the execution environment via a call (e.g., via asynchronous call) to the execution environment, and the functions may retire, without saving execution state for the function, and before the execution environment passes the metrics to an intermediate metrics aggregation service. The metric aggregation system receives the metrics generated by the fleet of instances of the function from the plurality of execution environments of the event-driven compute service, batch processes the metrics into an aggregated record, and transmits the aggregate record to a metrics reporting service.

20 Claims, 9 Drawing Sheets

(56) References Cited

U.S. PATENT DOCUMENTS

2019/0052549 A1* 2/2019 Duggal .............. H04L 41/5045

OTHER PUBLICATIONS

U.S. Appl. No. 15/269,936, filed Sep. 19, 2016, Garcia, et al.
U.S. Appl. No. 15/444,128, filed Feb. 27, 2017, Mason, et al.
Amazon Web Services, Inc., "AWS Lambda," downloaded from https://aws.amazon.com/lambda/ on Mar. 20, 2017, pp. 1-9.
Microsoft Azure, "Overview of metrics in Microsoft Azure," downloaded from https://docs.microsoft.com/enus/azure/monitoringand-diagnostics/monitoringoverviewmetrics, Mar. 2, 2017, pp. 1-18.
Janakiram MSV, "Ten Attributes of Serverless Computing Platforms," downloaded from https://thenewstack.io/tenat-tributesserverlesscomputingplatforms, Jan. 19, 2017, pp. 1-10.

* cited by examiner

INTERMEDIATE BATCH SERVICE FOR SERVERLESS COMPUTING ENVIRONMENT METRICS

BACKGROUND

Commoditization of computer hardware and software components has led to the rise of service providers that provide computational and storage capacity as a service. More traditional server-based service architectures require persistent provisioning and management of a server on behalf of a client. In this persistent type of traditional server architecture there may be sufficient excess capacity for the server to perform additional functionality, such as aggregating the metrics associated with server performance. The excess capacity and/or persistence of the persistent server may lend itself to software architectures that demand extra processing time (e.g., the extra processing time required by software architectures that use synchronous calls, instead of asynchronous calls, for example).

A more recent computing paradigm is a compute as a service environment that provides a serverless event driven compute service. In this stateless environment, clients may be charged for these compute services based on the amount of compute time consumed, instead of the number of virtual instances provisioned. In other words, the client code may be run only when it is needed. For example, event-based client code may be triggered, executed, and retired, all without the customer having to provision or manage servers. A few examples of event-based executable functions include image conversion, file compression, and change notifications, etc. This stateless architecture lends itself to parallel processing that triggers individually and scales more precisely with the size of the workload. Any of numerous event sources may be used to trigger event-based client code, such as receipt of an entry into a data store, or a user-interface click-based event, for example.

At least partly due to the ephemeral nature and/or the large number of instances some event-based executables, it may be a challenge to gather metrics from individual executions. For example, some event-based executables may trigger, execute, and retire before metrics can be gathered, batched and logged, or synchronous metric management may introduce unacceptably significant latency, or a centralized logging service may be overwhelmed by the large number of sources of metrics provided be each individual executable environment (e.g., in some systems each request triggers another individual executable).

Figure 1:
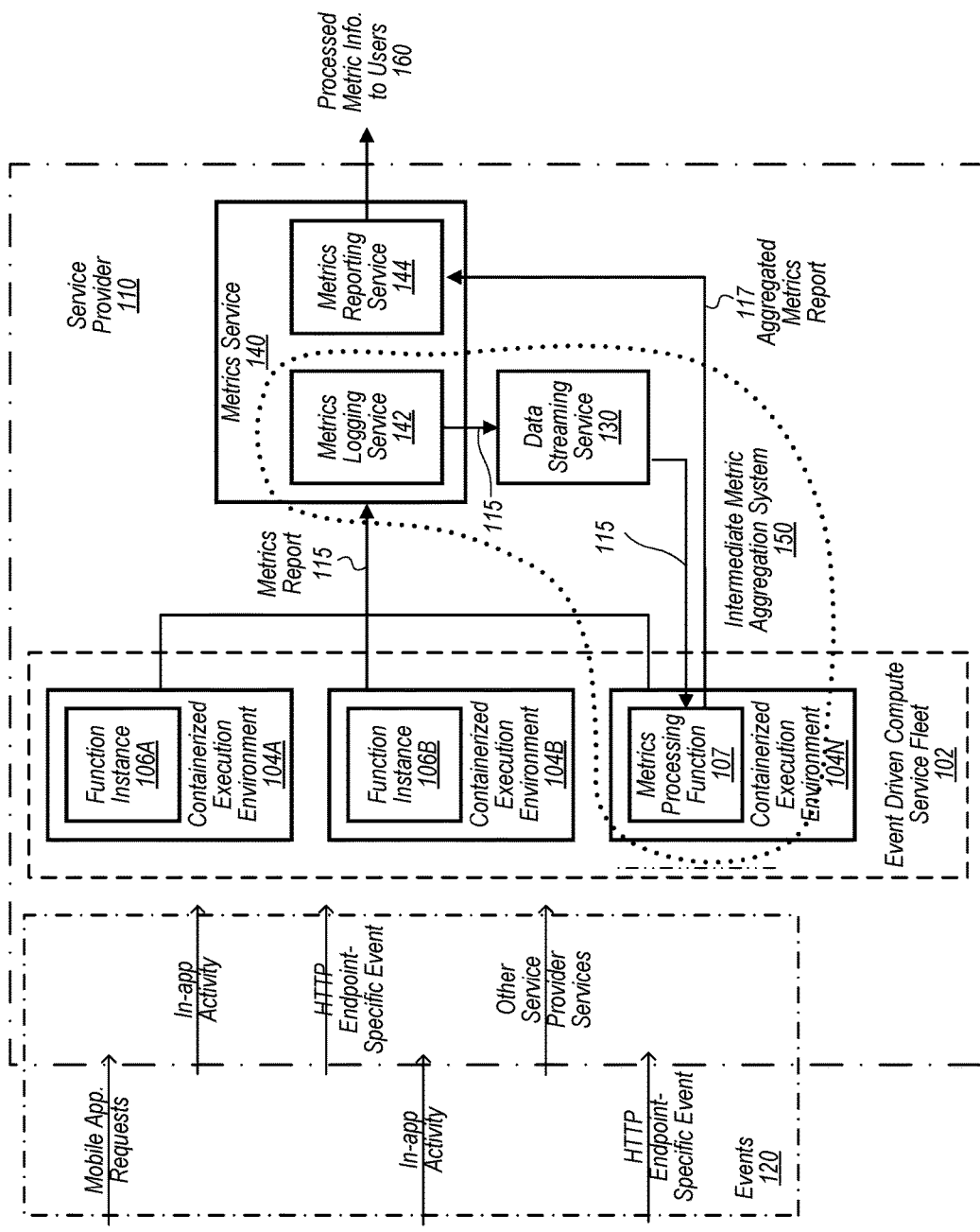
FIG. 1 depicts an example event-driven compute service with an intermediate metric aggregation system, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

While more traditional server-based architectures may require persistent provisioning and management of a server on behalf of a client, this more persistent type of traditional server architecture may have sufficient excess capacity such that the server can perform more resource intense processes (e.g., synchronous metric calls). However, in the stateless environment of a system architected under the serverless event-driven paradigm, this traditional metrics logging architecture may introduce undesirable latency to an environment that may measure a functions lifecycle in seconds.

Various embodiments of systems and processes that implement an intermediate metric aggregation service that processes metrics reports from a fleet of containerized execution environments of a serverless computing environment are disclosed. Event-driven compute services allow customers to run code without provisioning or managing servers. Another benefit is that for some service providers, customers of serverless computing environments only pay for compute time that is actually consumed. Such an environment may be conducive to high volume, low-latency services, in embodiments. Serverless computing environments may support a broad expanse of types of applications or backend services, executing the code and precisely scaling with high availability. In some instances, executable code in the serverless computing environment may automatically trigger from other services or when called directly (e.g., from a web or mobile app.).

In some embodiments disclosed herein, when the event-driven compute service scales, the large volume of instances of execution environments involved may overwhelm a traditional metrics service of a service provider (e.g., due to the large number of concurrent connections transmitting metrics reports from the large number of execution environments launching and retiring). Additionally, in some instances, the ephemeral nature of the event-driven stateless execution environments means that metrics (e.g., metrics descriptive of the health of the environment, or of the function executing in the environment, etc.) either may not be collected by the time the function retires (providers may try to minimize execution time to make the cost of the service attractive) or retirement of the function may be delayed such that the metrics are collected via a more robust synchronous process. Either case may be sub-optimal. A non-exhaustive list of example metrics includes number of requests, latency per request, and number of requests that error.

Disclosed herein are embodiments of an intermediate metric aggregation service that receives the metrics reports from the fleet of execution environments of the event-driven compute service that are executing instances of functions. In embodiments, various components of the event-driven compute service listen for events (e.g., triggers from other services or direct calls from a web or mobile app., etc.). For example, in some embodiments, a listener is a software design pattern in which an object maintains a list of dependents and notifies them automatically of any state changes, sometimes by calling a method. In some instances, events trigger the launch of functions registered to handle the events. The functions are each launched in separate execution environments or containers of the event-driven compute service, in embodiments.

In some embodiments, the execution environment of the event-driven compute service may provide an asynchronous logging function that logs metrics (e.g., metrics regarding the handling of one or more events, metrics regarding the function, metrics regarding the execution environment, etc.). The function may be constructed to call the asynchronous logging function of the execution environment to log metrics, in embodiments. In some embodiments, the execution environment may generate a metrics report that includes one or more metrics from the function and/or one or more metrics generated by the execution environment.

For instance, a function may be constructed to call the asynchronous logging function more than once to send metrics multiple times during a single execution of a function. The multiple metrics may be entered into a metrics record of the execution environment, in embodiments. In embodiments, the metrics are delivered whether or not the serverless compute instance errors out, which is in contrast to systems where the executable itself is responsible for more of the processing of the metrics (e.g., synchronously recording the metrics at the end of the execution prior to retirement of the function). However, it may not be necessary for the logging function to be asynchronous in all embodiments. The logging function may be synchronous in some embodiments.

In at least some instances, the execution environment of the event-driven compute service may be constructed to terminate the instance of the function upon completion of the instance of the function without saving an execution state for the function. The execution environment of the event-driven compute service may be constructed to transmit the metrics (e.g., in a metrics report) to a metric aggregation system, in embodiments.

In some embodiments, the event-driven compute service may be constructed to provide an interface to receive a specification of a destination for metrics. For instance, the specification may identify a destination for the metrics to be transmitted to in response to invocations of the asynchronous logging function of the execution environment. In a non-exhaustive list of examples, the specification may identify that metrics from the function or respective containerized execution environment can be sent to a configurable destination, such an intermediate metric aggregation service or a metrics logging service of the service provider.

In embodiments, the intermediate metric aggregation service receives the metrics reports and batch processes the metrics reports into an aggregated metric record, and/or may transmit the aggregated metric record to a metrics reporting service. For instance, a logging service may receive metrics reports from the execution environments of the event-driven compute service, and add the metrics reports to a metrics log instance of a logging service. In some embodiments, metrics reports from the metrics log may be sent to a data stream of a data stream service and the data stream may provide batches of the metrics reports to a metrics processing function. For instance, in at least some embodiments, one or more stream listeners monitor data streams and batch metrics reports that are posted to components of a metrics reporting service, for example.

In another example, the intermediate metric aggregation service may batch process the metrics reports (e.g., metrics reports from the metrics log instance that have entered the metrics data stream) by registering a metrics processing function with the event-driven compute service, and launching the metrics processing function in response to a metrics threshold being reached within the metrics data stream. In some instances, the metrics threshold is a time threshold since the last metrics batch was obtained from the metrics data stream, or a quantity threshold of metrics reports present in the data stream, for example.

In the following detailed description, FIGS. 1, 2, 6 and 7 illustrate block diagrams of various embodiments of example event-driven compute services with an intermediate metric aggregation service, according to at least some embodiments. FIGS. 3A/B-5 illustrate processes that may be performed by one or more components of the services illustrated in the block diagrams. In some embodiments, other components (not necessarily illustrated) may perform some portion of the depicted processes, and more or fewer steps of the illustrated processes may be performed without departing from the scope of the disclosure.

FIG. 1 depicts an example event-driven compute service with an intermediate metric aggregation service, according to at least some embodiments. Various components of the depicted system may perform steps of the processes illustrated in FIGS. 3A/B-5, in embodiments.

In particular, FIG. 1 illustrates an event-driven compute service fleet 102 of a service provider 110. The event driven compute service fleet 102 includes a fleet of containerized execution environments (104A-104N). A number of the containerized execution environments may be implemented by a single host (e.g., a server or a virtual instance) in embodiments. The following description explains the components of the service provider 110 that perform one or more of the steps of the metric aggregation process depicted in FIGS. 3A/B, 4 and 5, in at least some embodiments.

Figure 2:
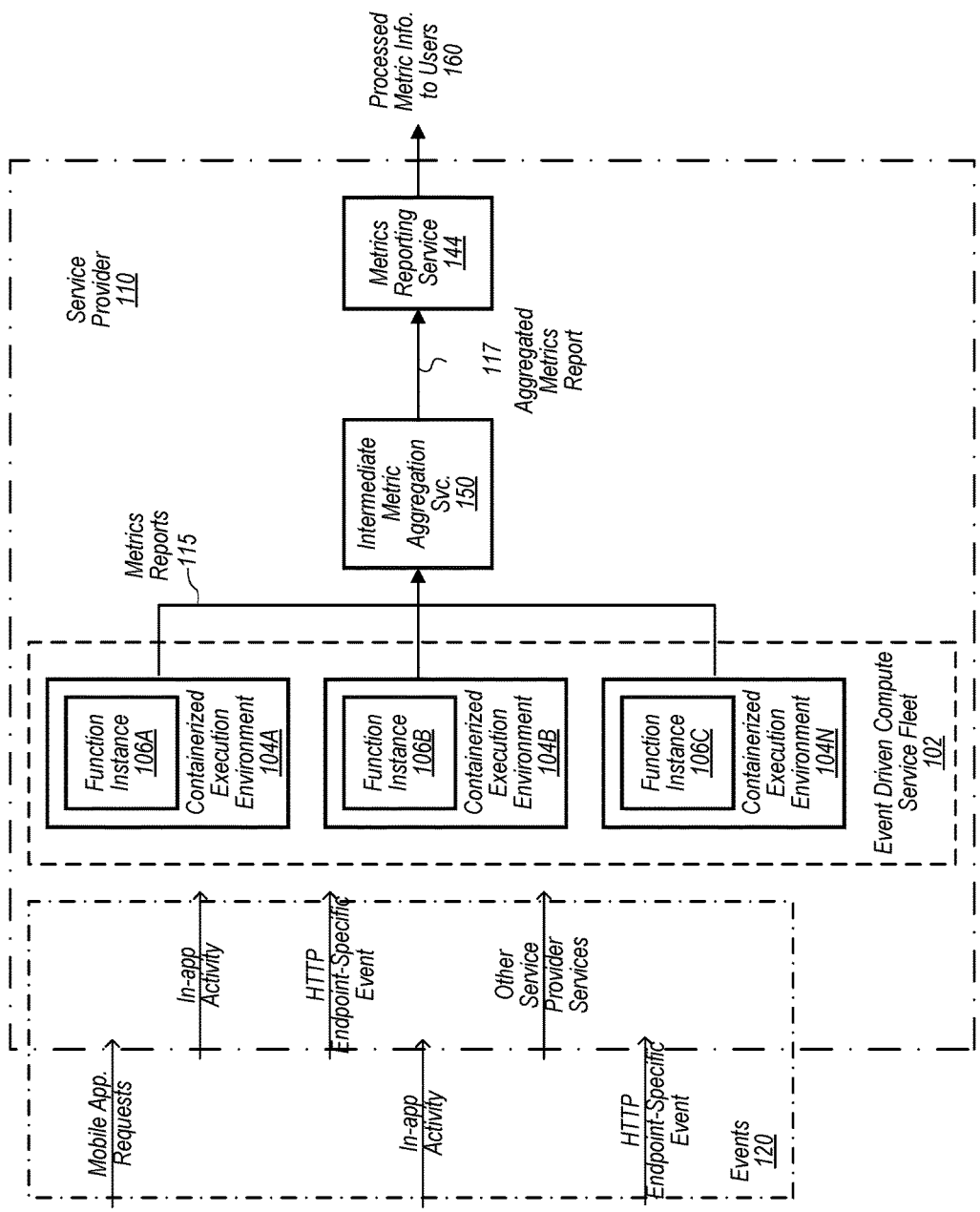
FIG. 2 depicts another architecture for an event-driven compute service with an intermediate metric aggregation service, according to at least some embodiments.
Figure 3A:
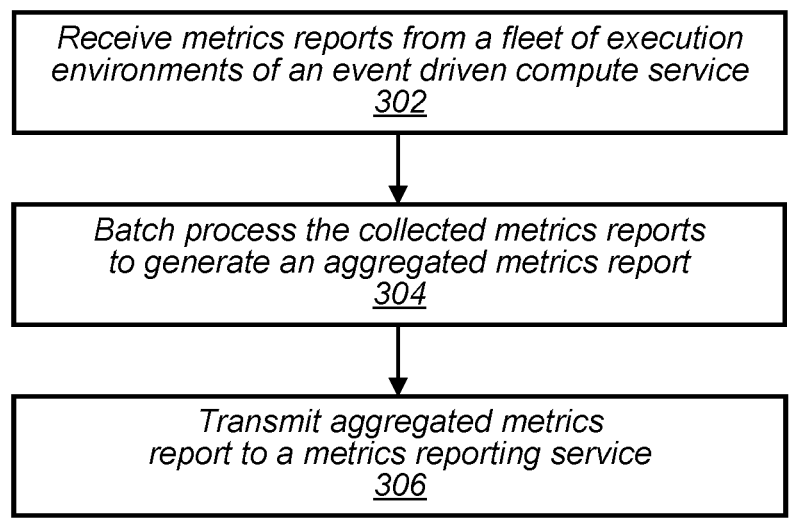
FIGS. 3A and 3B illustrate process diagrams that depict a metric aggregation process of an intermediate metric aggregation service of event-driven compute service, according to at least some embodiments.
Figure 3B:
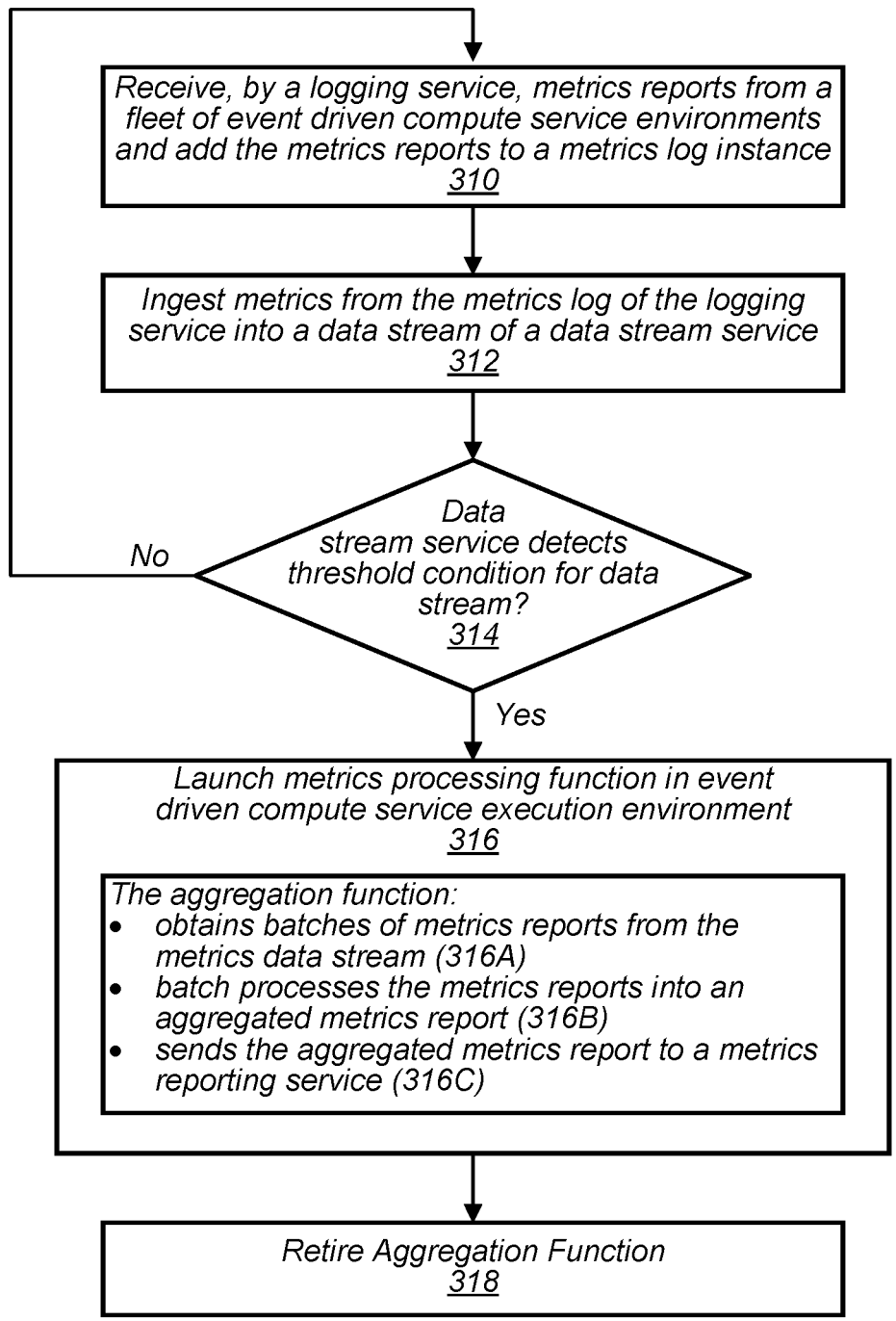
Figure 4:
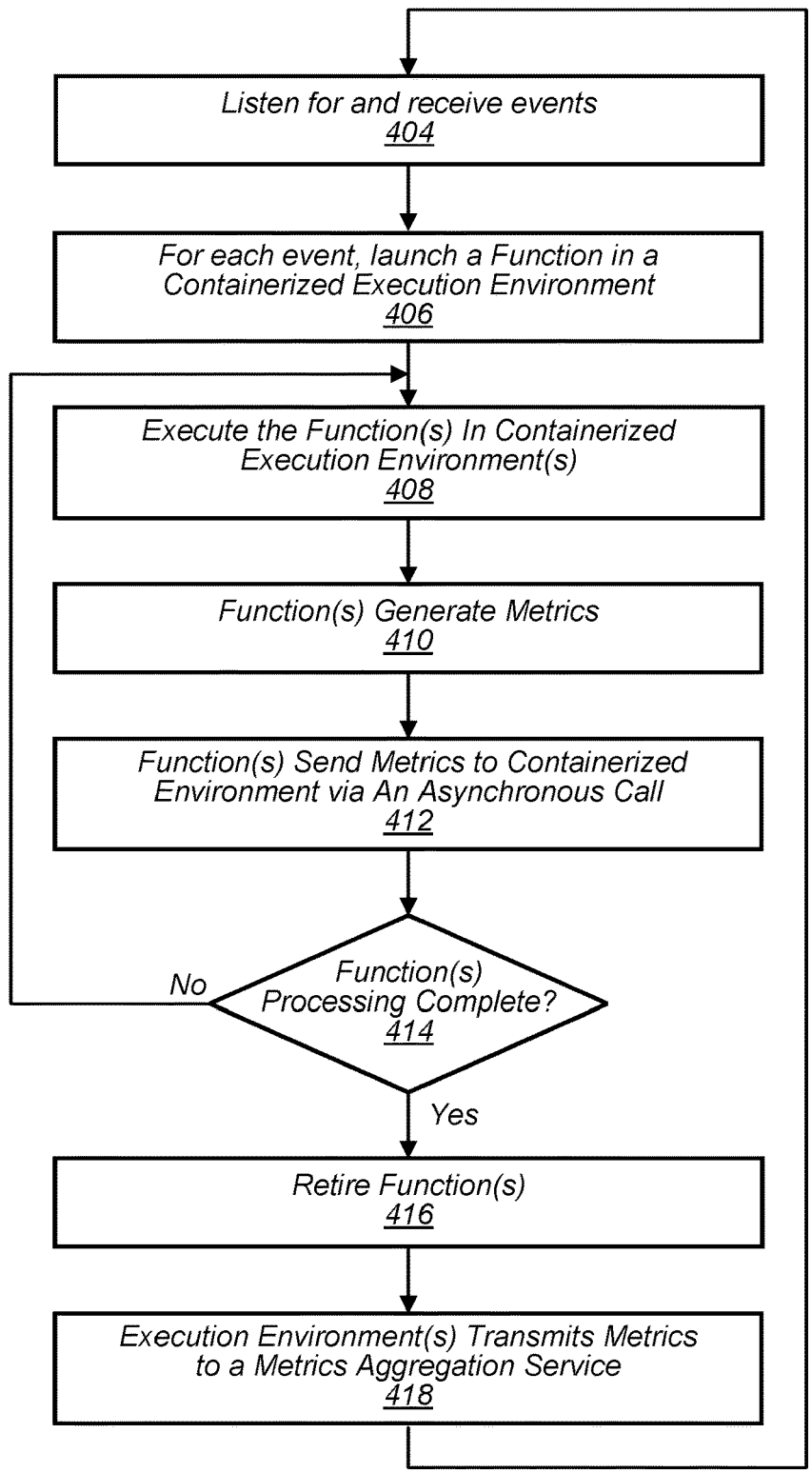
FIG. 4 illustrates a process diagram that depict a metric aggregation process of an intermediate metric aggregation service of an event-driven compute service, according to at least some embodiments.

FIGS. 3A and 3B illustrate process diagrams that depict a metric aggregation process of an intermediate metric aggregation service of an event-driven compute service, according to at least some embodiments. FIG. 4 illustrates a process diagram that depict another metric aggregation process of an intermediate metric aggregation service of an event-driven compute service, according to at least some embodiments. Generally, the event-driven compute service listens for and receives events (block 404) and launches a function in a containerized execution environment (e.g., 104) for each event (block 406). The events may take the form of any of various kinds of triggers, such as mobile application requests, in-application activity, receipt of a request directed to an HTTP endpoint specific event, etc., some of which are illustrated as 120 in FIGS. 1, 2 & 6. The event triggers may be received over one or more networks (e.g., network 260 in FIG. 7).

In the illustrated embodiment, the functions (e.g., 106) are run (block 408) in the containerized execution environments (e.g., 104), the executing functions generate metrics (block 410) and the functions send the generated metrics to respective containerized environments via an asynchronous call (block 412).

In embodiments, the function continues to be run and produce additional metrics (block 414, no), or if the function processing completes (block 414, yes) the function is retired (block 416) and the execution environment (e.g., 104) transmits the metrics (e.g., as a metrics report) to a metric aggregation system (e.g., 150) (block 418).

FIG. 1 illustrates that an intermediate metric aggregation service 150 may include various components of the service provider 110 system. Generally, the intermediate metric aggregation system receives metrics reports from a fleet of execution environments of an event-driven compute service (block 302), batch processes the collected metrics reports to generate an aggregated metrics report (block 304), and transmits the aggregated metrics report to a metrics reporting service (block 306). In particular, the intermediate metric aggregation system 150 is depicted as including the metrics logging service 142 of the service provider's metrics service 140, as well as components of the service provider's data streaming service 130, and a metrics processing function 107 that is executed in one of the containerized environments of the fleet (e.g., 104N).

For instance, in at least the illustrated embodiment, a metrics log is implemented at the metrics logging service 142 and receives (block 310) metrics reports 115 from the fleet of containerized execution environments 104. The received metrics reports 115 are added to an instance of a metrics log of the logging service 142, in embodiments.

Block 312 illustrates that metrics from the metrics log of the logging service 142 are ingested into a data stream of a data stream service 130. Block 314 illustrates that a threshold is used to determine whether the process enters a metrics processing phase (the metrics processing phase is illustrated at block 316) or continues to receive metrics reports into a metrics log (block 310), and ingest the metrics reports from the log instance into the data stream (block 312).

In embodiments, a metrics processing function is registered with the event driven compute service. Block 316 illustrates that the metrics processing function is launched in an execution environment 104 of the event-driven compute service if the threshold condition for the data stream has been met.

In particular, block 316 illustrates that if the threshold has been met (block 314, yes) the metrics processing function is launched and obtains batches of metrics reports from the metrics data stream (316A), batch processes the metrics reports into an aggregated metrics report (316B), and sends the aggregated metrics report to a metrics reporting service (316C). For example, FIG. 1 illustrates that metrics processing function 107 is launched in containerized execution environment 104N, obtains metrics reports from data streaming service 130 and provides an aggregated metrics report to the metrics reporting service 144. The aggregation function is retired (block 318) in embodiments. The metrics reporting service 144 transmits processed metric information to users at 160.

In the illustrated embodiment, the receipt of metrics reports, ingest of metrics and threshold detection appear in a loop that may iterate. In at least some embodiments, one or more of the other steps in the illustrated process may be performed concurrently. For example, metrics may be produced and metrics reports may be received concurrently with the launch of and processing by the metrics processing function. The aggregation function may launch again (e.g., when the threshold is reached) in embodiments.

FIG. 2 depicts another architecture for an event-driven compute service with an intermediate metric aggregation service 150, according to at least some embodiments. In at least the depicted embodiment, the event-driven compute service listens for and receives events 120 (block 404), and launches a function instance 106B in a containerized execution environment 104B for each event (as in block 406). The functions are executed in the respective containerized execution environments 104 (block 408) and generate metrics 115 (block 410) that the functions 106 send to the respective containerized environments 104 via an asynchronous call (block 412). When the processing of a particular function is complete (block 414, yes) the function is retired (block 416) and the execution environment 104B for the retired function 106 transmits the metrics reports 115 to the metrics aggregation service 150. The metrics reports may be transmitted to the aggregation service 150 either before or after the function 106 is retired, in some embodiments.

In at least the depicted architecture, the intermediate metric aggregation service 150 receives metrics reports from a fleet 102 of execution environments of an event-driven compute service and the intermediate metric aggregation service 150 batch processes the collected metrics reports to generate an aggregated metrics report 117 to the metrics reporting service 144. The metrics reporting service 144 transmits processed metric information to users at 160.

Figure 5:
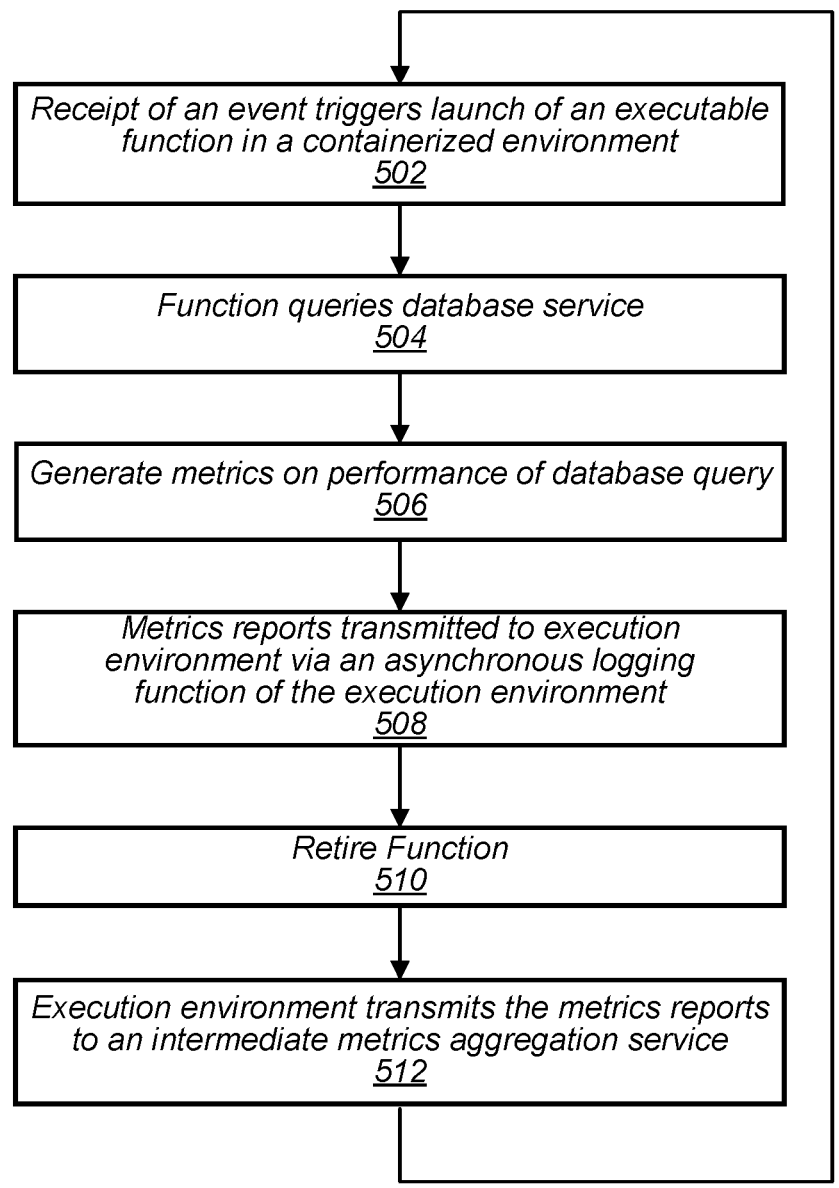
FIG. 5 illustrates a process diagram that illustrates a metric reporting process within the context of a database oriented function executed by event-driven compute service, according to at least some embodiments.

FIG. 5 illustrates a process diagram that illustrates a metric reporting process within the context of a database oriented function executed by event-driven compute service, according to at least some embodiments. The depicted process may be performed by at least the various components illustrated in the block diagrams of FIGS. 1, 2, 6 and 7, in embodiments.

In at least the depicted process diagram, receipt of an event triggers launch of an executable function in a containerized environment (block 502). For example, receipt of events 120 triggers launch of a function instance 106B in containerized execution environment 104B. In at least some embodiments, instances of the function execute concurrently with one another. In some embodiments, concurrent execution may reach such large numbers that metrics reporting by the concurrent execution environments may (e.g., without intermediate aggregation) overwhelm a metrics service (e.g., a metrics service provided by a service provider as a service 140). In the illustrated embodiment, the function (e.g., function instance 106B) queries a database service (e.g., data source 710, 718 in FIG. 7) (block 504). Metrics on the performance of the database query are generated (block 506). For instance, a database query may cause the database service (e.g., database service 612) not only to provide the requested data, but also cause the database service to report various metrics associated with the query (e.g., query response time or the like). In some embodiments, the function instance itself may report metrics regarding the performance of the database query.

The metrics are logged via an asynchronous logging function of the execution environment (block 508). For instance, the function instance 106 may make an asynchronous call to the containerized execution environment 104 to transmit the metrics to the execution environment 104. The function may continue to execute and transmit additional metrics, in embodiments. In embodiments, the function may send the metrics any point during execution. Once the functionality associated with the trigger event has been performed by the executing function, the function may be retired (block 510). The execution environment may consolidate the metrics into a metrics report and transmits the metrics report to an intermediate metric aggregation service (e.g., 150). The execution environment may transmit the metrics report prior to, or subsequent to, retirement of the function, in embodiments. The process may repeat as new event triggers are received and the associated functions launched in respective containerized environments.

Figure 6:
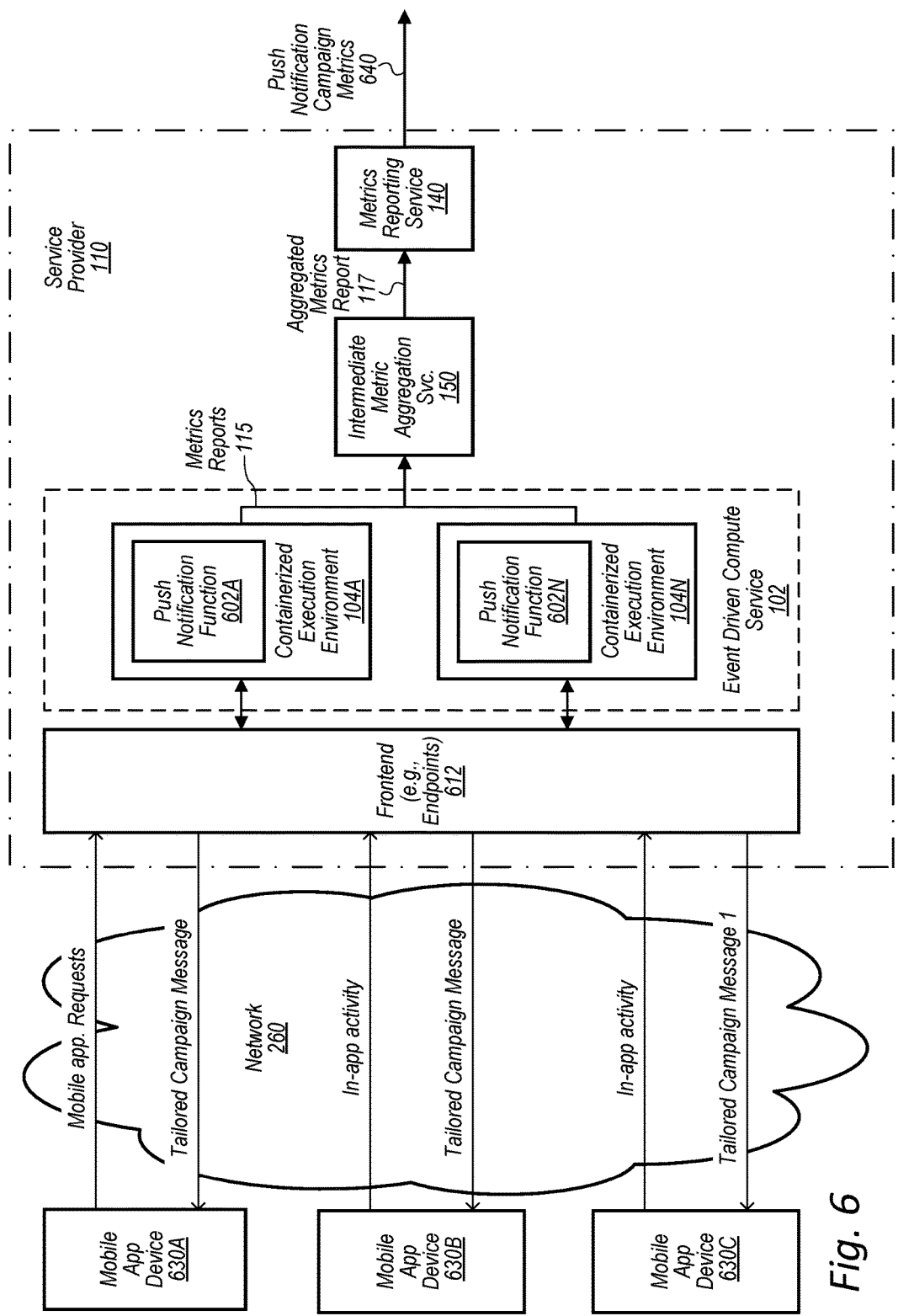
FIG. 6 depicts an intermediate metric aggregation service for an event-driven compute service implementation of a push messaging service, according to at least some embodiments.

FIG. 6 depicts an intermediate metric aggregation service for an event-driven compute service implementation of a push notification service, according to at least some embodiments. Generally, a push notification service register an access point for publishing messages and allows clients to subscribe to notifications. Policies may then be set, such as limiting who can publish message or subscribe to notifications, or specifying which notification protocols will be supported (i.e. HTTP/HTTPS, email, SMS). Subscribers are clients interested in receiving notifications from topics of interest; they can subscribe to a topic or be subscribed by the topic owner. Subscribers specify the protocol and end-point (URL, email address, etc.) for notifications to be delivered. When publishers have information or updates to notify their subscribers about, they can publish a message to the topic— which immediately triggers the notification service to deliver the message to all applicable subscribers.

FIG. 6 illustrates a system architecture that captures and aggregates metrics reports from execution environments 104A-N that are executing push notification service functions 602A-N responsive to event triggers from an application running on mobile devices 630A-C.

A non-exhaustive list of event triggers are mobile application requests (mobile app. requests), and in-application activity (in-app activity), for example. In at least the illustrated example, the event triggers may be generated by one or more applications running on a device (e.g., mobile application devices 630A-C) and transmitted to a destination target or endpoint (e.g., frontend 612) of the service provider 110. A non-exhaustive list of the type of metrics that may be reported includes a history of such information as the identity of an API caller, the time of the API call, the source IP address of the API caller, the request parameters, and the response elements returned by notification service, the number of times the app was opened as a result of the campaign, and revenue generated from campaigns, etc. for example.

In at least the illustrated embodiment, the triggering events are received at the frontend 612 from the mobile application devices 630. The process then continues in a manner similar to that illustrated in FIG. 4. For each event, a push notification function 602 is launched in a containerized execution environment. The push notification function 602 is executed in the environment and generates metrics that are sent via a call to the respective environment (e.g., asynchronous or synchronous). Execution of the push notification function 602 results in push notifications being sent to the mobile application devices 630. In the illustrated embodiment, tailored campaign messages are sent to the mobile application devices. Although various other types of message may be sent, in embodiments.

In embodiments, the intermediate metric aggregation service may be part of the event driven compute service. For instance, the intermediate metric aggregation service 150 in FIG. 6 may be part of the event driven compute service 102 in FIG. 6.

In embodiments, once the function has completed the processing of the tasks associated with the events it is registered to respond to, the function is retired and the execution environment transmits a metrics report to a metrics aggregation service (e.g., 150). In some embodiments, such an architecture and process allows the function to be retired prior to the metrics being sent (e.g., as a metrics report) to the metrics aggregation service (thus reducing the function execution time/cost associated with the customer and freeing up the execution environment for another function).

In at least the illustrated embodiment, the intermediate metric aggregation service 150 processes the metrics reports 115 into an aggregated metric report 117 that is provided to a metrics reporting service (e.g., 140) the transmits push notification campaign metrics 640 (e.g., for display to customers via a customer display console—not illustrated).

Figure 7:
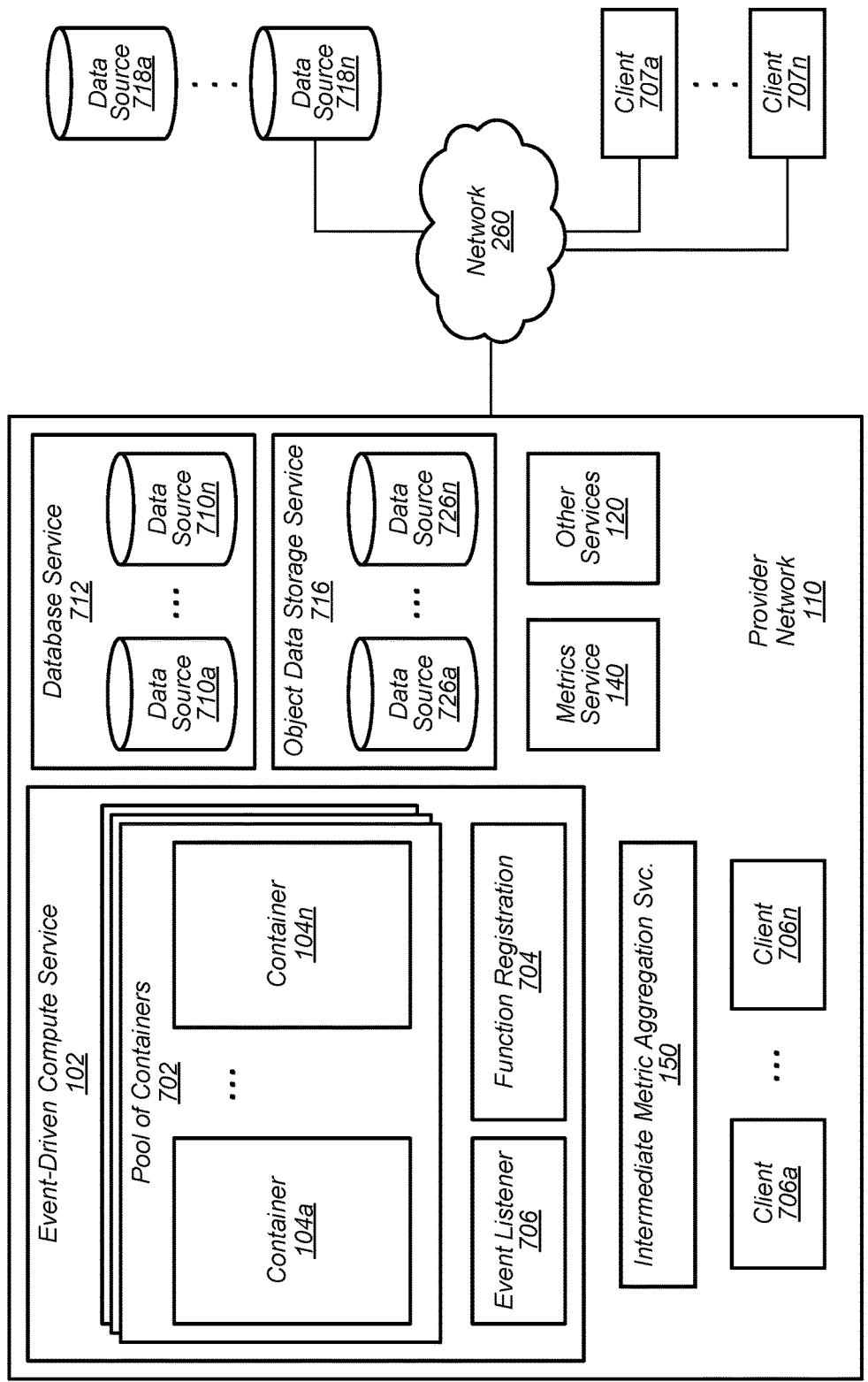
FIG. 7 is a block diagram illustrating an example event-driven compute service with an intermediate metric aggregation service, according to at least some embodiments.

FIG. 7 illustrates an event driven compute service 102, according to some embodiments. In embodiments, the provider network 110 depicted in FIG. 7 may be the same type of provider network, and include some or all of the components as other provider networks depicted in FIGS. 1, 2, 6 and 7.

In the depicted embodiment, the provider network 102 includes an event-driven compute service 102. In the depicted embodiment, clients 706/707 (e.g., mobile application devices 630, in some embodiments) send requests for functions to be executed in containers in response to events. As shown, the clients 706 are within the provider network. For example, the clients 706 may be software applications running on a compute instance and/or computing device within the provider network 110. In some embodiments, some or all of the clients may be external clients 708 that are located external to the provider network 110. For example, the clients 110 may be located at a client's data center or other external location used by a client of the provider network 110.

In embodiments, any of the clients 706, 707 may access one or more data sources as a data source. A data source may be within the provider network, such as a data source 710 of a database service 712 or a data source 714 of an object data storage service 716, for example. A data source may be a data store and/or software application external to the provider network, such as an external data source 718, in embodiments. In embodiments, a data source may be a software application within the provider network 110, such as one or more other services 120. As shown, a network 260 may allow external clients 707 and external data sources 710 to communicate with the provider network 110 and with each other.

In embodiments, functions are registered with the service provider and data associated with the function (e.g., function code, identifiers for each function, and/or any other associated information), may be stored in a data storage of the event-driven compute service 102 and/or any other data storage of the provider network 102 (e.g., database service 712 or object data storage service 716) or any data storage used by with the provider network.

In some embodiments, the function code may be written and/or provided by the provider network 102. In some cases, the function code may be written by the client and provided to the provider network 102. In other embodiments, a portion of the function code is written and/or provided by the provider network 102 and a portion of the function code is written by the client and provided to the provider network 102.

In embodiments, a number of containers are each assigned to the registered function to form a pool of containers 702 for the registered function. A given container may be an execution environment capable of executing the registered function. For example, each container of the pool of containers 702 may include a java virtual machine capable of executing the registered function. In embodiments, each container of the pool of containers 702 may be any other execution environment capable of executing the registered function. In some embodiments, event-driven compute service 102 may include any number of different execution environments that may be used to execute any number of different registered functions.

In embodiments, function registration 704 may store identifiers within the event-driven compute service 102 for one or more registered functions. Additional data associated with registered functions may also be stored in function registration 704, such as defined events that trigger a registered function in the event-driven compute service 102. In embodiments, function registration 704 may be a table, list, or any other data structure suitable for storing data associated with registered functions. In embodiments, some or all of the data associated with registered functions is stored in the provider network 110 outside of the event-driven compute service 102 (e.g., in the database service 712, object data storage service 716) or external to the provider network 110.

In at least the depicted embodiment, the event listener 706 listens for events that trigger registered functions (e.g., a request from a particular client). In embodiments, the event listener 706 may include data that describes the triggering events or has access to data that describes the triggering events. In an embodiment, the event listener 706 receives a request and determines that the request matches a defined event for the registered function. In response, the event listener 706 selects a container from the pool of containers 702 and sends event information based on the request to the selected container. In response, the selected container launches the registered function as an active function. In various embodiments, actions performed by the event-driven compute service 102, including actions by the event listener 706 and the function registration 704, may be performed by the same service/software module and/or hardware or any other combination of services/software modules and/or hardware of the event-driven compute service. In embodiments, based on the received event information, the active function may perform any of various different actions.

Illustrative System

Figure 8:
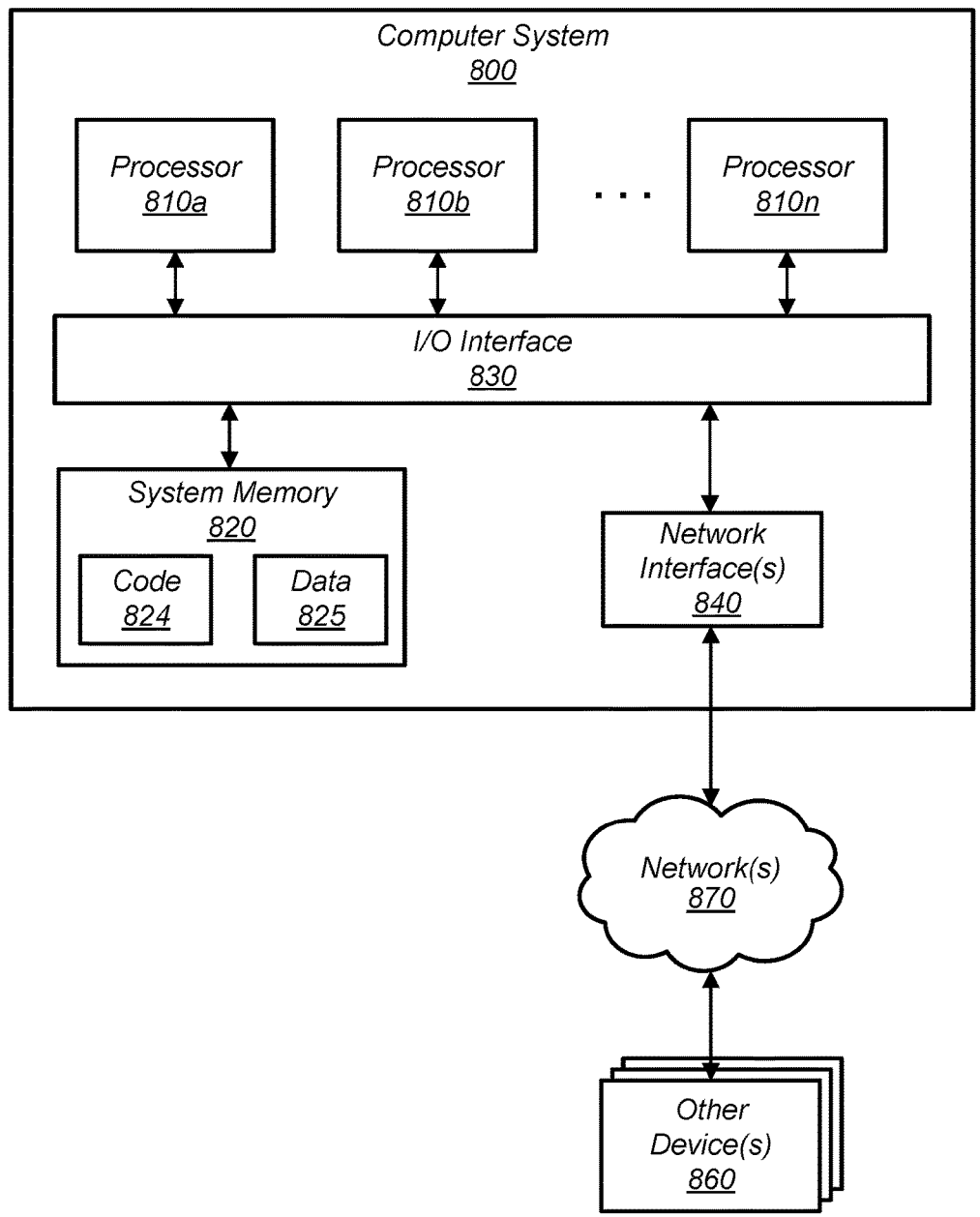
FIG. 8 is a block diagram illustrating an example computer system that may be used in some embodiments.

Any of various computer systems may be configured to implement processes associated with an event-driven compute service. For example, FIG. 8 is a block diagram illustrating one embodiment of a computer system suitable for implementing some or all of the techniques and systems described herein. For example, each of the computer systems may host one or more respective containers. In some cases, a host computer system may host multiple containers. In various embodiments, the provider network may include one or more computer systems 800 such as that illustrated in FIG. 8 or one or more components of the computer system 800 that function in a same or similar way as described for the computer system 800.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of servers implementing enterprise logic or downloadable application, while in other embodiments servers may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor 810. In various embodiments, system memory 820 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or provider network are shown stored within system memory 820 as program instructions 824. In some embodiments, system memory 820 may include data 825 which may be configured as described herein.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other devices attached to a network, such as between a client devices (e.g., 706/707 or mobile application devices 630) and other computer systems, or among hosts 767, for example. In particular, network interface 840 may be configured to allow communication between computer system 800 and/or various other device 860 (e.g., I/O devices). Other devices 860 may include scanning devices, display devices, input devices and/or other communication devices, as described herein. Network interface 840 may commonly support one or more wireless networking protocols (e.g., Wi-Fi/IEEE 802.7, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 800. In general, an I/O device (e.g., cursor control device, keyboard, or display(s)) may be any device that can communicate with elements of computing system 800.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
an event-driven compute service configured to:
in response to receipt of a plurality of event instances, launch a corresponding plurality of instances of a function registered to handle at least one event type corresponding to the event instances, wherein each instance of the function is launched in a separate execution environment of the event-driven compute service and wherein at least some of the instances of the function execute concurrently with one another;
wherein the function is configured to call an asynchronous logging function of the execution environment provided by the event-driven compute service to log metrics regarding handling of the one or more events;
wherein each execution environment of the event-driven compute service is configured to:
upon completion of an instance of the function, terminate the instance of the function without saving execution state for the function; and
transmit the metrics to a metric aggregation system; and
the metric aggregation system, configured to:
receive the metrics for the plurality of instances of the function from the plurality of execution environments of the event-driven compute service;
batch process the metrics into an aggregated record; and
transmit the aggregate record to a metrics reporting service.

2. The system as recited in claim 1, wherein the metric aggregation system comprises a metrics log implemented at a logging service configured to:
receive metrics as metrics reports from the execution environments of the event-driven compute service, and
add the metrics reports to a metrics log instance.

3. The system as recited in claim 2, wherein the metric aggregation system comprises a metrics data stream implemented via a data stream service and configured to:
input metrics reports from the metrics log instance, and
provide batches of metrics reports to a metrics processing function executed on one or more of the execution environments.

4. The system as recited in claim 3, wherein the metrics processing function executed on one or more of the execution environments is configured to:

obtain the batches of metrics reports from the metrics data stream, perform said batch process the metrics reports into an aggregated metrics report, and perform said transmit the aggregated metrics report to the metrics reporting service.

5. The system as recited in claim 1, wherein the event-driven compute service provides an interface to receive a specification of a destination for metrics to be transmitted to in response to invocations of the asynchronous logging function of the execution environment provided by the event-driven compute service.

6. A method, comprising:

performing by one or more computing devices comprising one or more hardware processors:

receiving, over a network by an intermediate metric aggregation service, metrics reports from a fleet of execution environments of an event-driven compute service, wherein at least some the metrics in the metrics reports are generated by concurrently executing instances of a function launched in separate execution environments of the event-driven computer service, each of the instances of the function launched in response to receipt of respective instances of one or more events;

batch processing, at the intermediate metric aggregation service, the received metrics reports to generate an aggregated metrics report; and transmitting, from the intermediate metric aggregation service, the aggregated metrics report over a network to a metric reporting service, wherein the transmitted metrics report includes metrics from each of the concurrently executing instances of the function executed in the separate execution environments of the event-driven computer service.

7. The computer implemented method of claim 6, further comprising:

prior to a given one of the execution environments sending the metrics report that is received by the intermediate aggregation service, receiving, by the given execution environment, in response to an event and from an instance of a function launched in the execution environment, a call to an asynchronous logging function of the execution environment to log metrics regarding handling of the event, wherein one or more metrics for the metrics report are included with the received asynchronous call.

8. The computer implemented method of claim 7, further comprising:

upon completion of the instance of the function, terminating the instance of the function without saving an execution state for the function.

9. The computer implemented method of claim 6, wherein performing said receiving metrics reports from the fleet of execution environments of an event driven compute service further comprises:

implementing a metrics log instance at a logging service; and adding the metrics from the metrics reports to the metrics log instance.

10. The computer implemented method of claim 9, further comprising:

receiving, by a metrics data stream implemented via a data stream service, metrics reports from the metrics log instance; and providing, by the metrics data stream, batches of metrics reports to a metrics processing function.

11. The computer implemented method of claim 10, further comprising:

registering the metrics processing function with the event-driven compute service, and launching the metrics processing function in response to a metrics threshold being reached within the metrics data stream.

12. The computer implemented method of claim 11, wherein the metrics threshold is a time threshold since the last metrics batch was obtained from the metrics data stream, or a quantity threshold of metrics reports present in the data stream.

13. The computer implemented method of claim 6, further comprising:

receiving, by an interface, a specification of a destination for metrics to be transmitted to in response to invocations of the asynchronous logging function of the execution environment provided by the event-driven compute service.

14. A non-transitory computer readable storage medium storing program instructions that, when executed by a computer, cause the computer to perform:

receiving, by an intermediate metric aggregation service, metrics reports from a fleet of execution environments of an event-driven compute service, wherein at least some the metrics in the metrics reports are generated by concurrently executing instances of a function launched in separate execution environments of the event-driven computer service, each of the instances of the function launched in response to receipt of respective instances of one or more events;

batch processing, at the intermediate metric aggregation service, the received metrics reports to generate an aggregated metrics report; and transmitting, from the intermediate metric aggregation service, the aggregated metrics report to a metric reporting service, wherein the transmitted metrics report includes metrics from each of the concurrently executing instances of the function executed in the separate execution environments of the event-driven computer service.

15. The non-transitory computer readable storage medium of claim 14, wherein the program instructions cause the computer to further perform:

prior to a given one of the execution environments sending the metrics report that is received by the intermediate aggregation service, receiving, by the given execution environment, in response to an event and from an instance of a function launched in the execution environment, a call to an asynchronous logging function of the execution environment to log metrics regarding handling of the event, wherein one or more metrics for the metrics report are included with the received asynchronous call.

16. The non-transitory computer readable storage medium of claim 14, wherein the program instructions cause the computer to further perform:

upon completion of the instance of the function, terminating the instance of the function without saving an execution state for the function.

17. The non-transitory computer readable storage medium of claim 16, wherein to perform said receiving metrics reports from the fleet of execution environments of an event driven compute service, the program instructions cause the computer to further perform:

implementing a metrics log instance at a logging service; and adding the metrics from the metrics reports to the metrics log instance.

18. The non-transitory computer readable storage medium of claim 14, wherein the program instructions cause the computer to further perform:

receiving, by a metrics data stream implemented via a data stream service, metrics reports from the metrics log instance; and providing, by the metrics data stream, batches of metrics reports to a metrics processing function.

19. The non-transitory computer readable storage medium of claim 18, wherein the program instructions cause the computer to further perform:

registering the metrics processing function with the event-driven compute service, and launching the metrics processing function in response to a metrics threshold being reached within the metrics data stream.

20. The non-transitory computer readable storage medium of claim 18, wherein the metrics threshold is a time threshold since the last metrics batch was obtained from the metrics data stream, or a quantity threshold of metrics reports present in the data stream.

\* \* \* \* \*